RADIO FREQUENCY INTERFERENCE SUPPRESSION CIRCUIT FOR FREQUENCIES IN EXCESS OF 100 MEGACYCLES

Filed April 25, 1962

INVENTORS
VAN B. CONES
KENNETH PARKER
BY
W. H. Loesch
ATT'YS.

United States Patent Office 3,327,132

Patented June 20, 1967

3,327,132

RADIO FREQUENCY INTERFERENCE SUPPRESSION CIRCUIT FOR FREQUENCIES IN EXCESS OF 100 MEGACYCLES

Van B. Cones and Kenneth Parker, Indianapolis, Ind., assignors to the United States of America as represented by the Secretary of the Navy Filed Apr. 25, 1962, Ser. No. 190,182

3 Claims. (Cl. 307—88.5)

Figure 1:
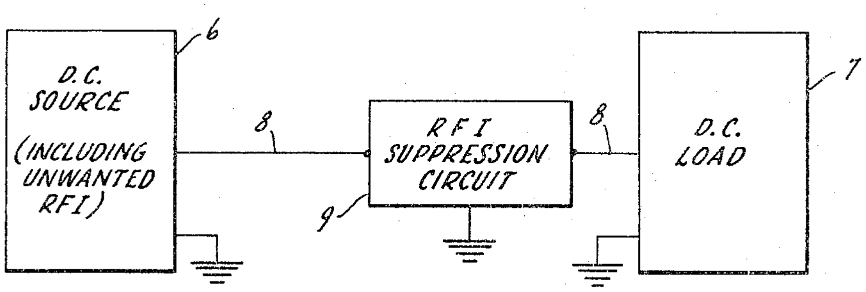

The invention described herein may be manufactured and used by or for the Government of the United States of America for governmental purposes without the payment of any royalties thereon or therefor.

The present invention relates generally to the reduction and control of electrical interference energy and more particularly to elimination and/or suppression of radio frequency interference (RFI) in complex electronics equipment.

As the number and complexity of electronics systems, utilizing vast areas of the frequency spectrum for both commercial and military applications, continue to grow at an ever increasing rate, one of the most critical problems confronting equipment engineers is that of developing means for reducing and/or controlling RFI within component equipments in order to produce compatible systems having no more than a maximum tolerable amount of RFI with respect to all of the various environments in which they must be utilized. This RFI may result from many varied sources, both internal and external relative to the affected equipment, and its presence is extremely objectionable in conductors intended for carrying direct currents; unless this type of interference can be suppressed or eliminated, as required, the effectiveness of the concerned equipment will be considerably diminished, if not completely destroyed. Previous methods of RFI suppression include bypass and feed-through capacitors, inductance-capacitance (L-C) and resistance-capacitance (R-C) filter networks, and ferrox shielding beads. These methods, although useful in certain limited frequency ranges, have proven undesirable in several respects; for example, lead wires of bypass capacitors may resonate at high frequencies and thus become a source of RFI themselves and such capacitors are bulky and expensive for RFI suppression at low frequencies, ferrox shielding beads and L-C filter networks may also resonate at high frequencies thus increasing the RFI problem at these frequencies, and R-C filter networks provide only limited results at low frequencies or high currents.

The present invention overcomes many of these difficulties by providing a compact, inexpensive circuit for suppressing or removing RFI from conductors utilized for carrying direct currents. This invention has a wider satisfactory frequency range of operation than devices of the prior art and is composed of common components whose values and characteristics are not critical. The invention is easily adapted to, and may be readily utilized in, equipment already designed and constructed.

An object of the present invention is the provision of a device for reducing or suppressing radio frequency interference in electronic circuitry.

Another object is to provide an inexpensive and compact circuit for removing radio frequency interference from conductors intended for carrying direct currents.

A further object of the invention is the provision of an economical and effective radio frequency interference suppression circuit which is easily adapted to use in equipment already constructed.

Still another object is to provide an RFI suppression circuit usable over a wide frequency range and which is comprised of standard components whose values and characteristics are not critical.

Figure 2A:
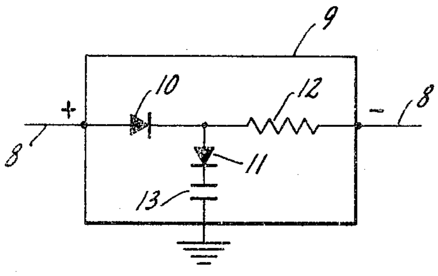
Figure 2B:
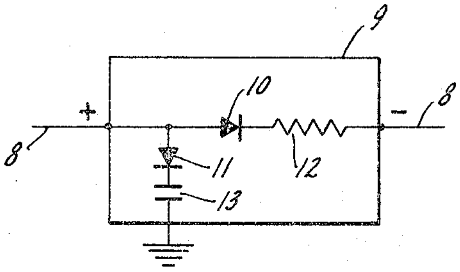
Figure 2C:
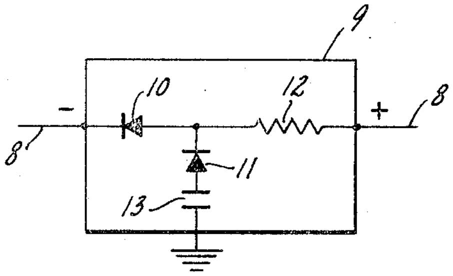

Other objects and features of the invention will become apparent to those skilled in the art as the disclosure is revealed in the following detailed description of several preferred embodiments of the invention as illustrated in the accompanying sheet of drawing in which:

FIGURE 1 is a block diagram showing the invention being utilized in a typical application, and FIGURES 2*a*, 2*b*, and 2*c* disclose in schematic form various embodiments of the invention.

Referring now to the drawing wherein like reference characters designate like or corresponding parts throughout the various views, there is shown in FIGURE 1 a direct current (D.C.) potential source 6 for supplying power to a load or utilization circuit 7 by means of a conductor 8. The invention 9 is inserted in conductor 8 in order to suppress unwanted RFI present in or generated by D.C. source 6 and thus prevent such interference from reaching load 7 where its presence would be highly objectionable.

FIGURE 2*a* shows one embodiment of the invention 9 in schematic form for use in a circuit of the type shown in FIGURE 1 when the respective polarities are such that the conventional current flow would normally be from source 6, via conductor 8, to load 7. FIGURE 2*b* shows a second embodiment for use with the same respective polarities as in FIGURE 2*a*, but indicating that diode 11 may be coupled on either side of diode 10. FIGURE 2*c* indicates a third embodiment wherein diodes 10 and 11 are reversed in polarity for applications where source 6 is required to provide a negative, rather than positive, potential to load 7. In FIGURES 2*a*, 2*b*, and 2*c*, diodes 10 and 11 may be of any common variety such as silicon or germanium, resistance 12 may be lead wiring or other resistance and need be only sufficiently large to present a greater impedance to alternating current than capacitance 13, whose value also is not critical.

*Operation*

In operation, assuming FIGURE 2*a* to be utilized in block 9 of FIGURE 1 and the relative polarities to be such that source 6 is to supply a positive D.C. potential to load 7, the invention will suppress RFI generated by, or present in, source 6 or induced into conductor 8, in the following manner. Any negative half-cycles of RFI attempting to flow from source 6 to load 7 will be blocked by diode 10 and any positive half-cycles will, upon being passed by diode 10, take the path of least resistance to ground via diode 11 and capacitance 13 which at the same time blocks the desired direct current forcing it to flow through a small resistance 12 to load 7. Thus it can be seen that the invention, RFI suppression circuit 9, removes unwanted RFI and voltage transients from the potential supplied to load 7 by source 6. FIGURE 2*b* when substituted for block 9 of FIGURE 1 performs in the same manner as did FIGURE 2*a* and is included merely to show that the conduction circuit to ground comprised of diode 11 and capacitance 13 may be coupled on either side of diode 10 with satisfactory results.

If it is desired to operate source 6 at a lower D.C. potential than load 7 (i.e., supplying a negative potential to load 7) then to adapt the invention to this polarity, it is necessary only to reverse the polarity of diodes 10 and 11, as shown in FIGURE 2*c* so that diode 10 therein blocks all positive half-cycles of RFI or transient voltages, and diode 11 and capacitance 13 conducts all negative half-cycles of such un desired alternating current or transient voltages to ground permitting only the desired negative D.C. potential to be presented to load 7.

It therefore becomes apparent from the foregoing description and annexed drawing that the invention, a radio fequency interference suppression circuit, is a useful and practical circuit having many applications in the field of electronics broadly, and the area of interference elimination in particular. The utility of this circuit is enhanced by its ease of adaptability to equipment already constructed, and its small size, increased reliability over prior methods, and initial economy of construction.

Obviously many modifications and variations of the present invention are possible in the light of the above teachings as evidenced by the various embodiments of FIGURE 2. It is therefore to be understood, that within the scope of the appended claims, the invention may be practiced otherwise than as specifically described.

We claim:

1. An improved radio frequency interference suppression circuit for frequencies above 100 megacycles comprising:
input means for receiving direct current signals containing undesired radio frequency interference signals superimposed thereon;
a first electrical limiting means coupled to said input means and being polarized in such direction as to pass said direct current signals while blocking all half-cycles of said undesired radio frequency interference signals polarized in an opposite direction thereto;
a second electrical limiting means coupled in series with a capacitance between said input means and a source of ground potential and being polarized in a direction to enable conduction to ground of all half-cycles of said undesired radio frequency interference signals polarized so as to be passed by said first electrical limiting means;
an output means for supplying said direct current signals, free from said radio frequency interference signals, to a load, said output means being direct current coupled to said first electrical limiting means.

2. A radio interference suppression circuit in accordance with claim 1 wherein said first and second electrical limiting means are diode rectifying means.

3. An improved radio frequency interference suppression circuit for frequencies above 100 megacycles comprising:
input means for receiving direct current signals containing undesired radio frequency interference signals superimposed thereon;
a first diode means coupled to said input means and being polarized in such direction as to pass said direct current signals while blocking all half-cycles of said undesired radio frequency inteference signals polarized in an opposite direction thereto:
a second diode means coupled in series with a capacitance between said input means and a source of ground potential and being polarized in a direction to enable conduction to ground of all half-cycles of said undesired radio frequency interference signals polarized so as to be passed by said first diode means;
an output means for supplying said direct current signals, free from said radio frequency interference signals, to a load, said output means being direct current coupled to said first diode means.

References Cited

UNITED STATES PATENTS 2,935,686 5/1960 Kerns et al. ------ 307—88.5 X
2,995,697 8/1961 Grenier ----------- 307—88.5

OTHER REFERENCES

Hunter: Handbook of Semiconductor Electronics, pp. 4–20 to 4–22.

ARTHUR GAUSS, *Primary Examiner.*

CHESTER L. JUSTUS, *Examiner.*

J. S. HEYMAN, *Assistant Examiner.*